(12) United States Patent
Subramanian

(10) Patent No.: US 6,930,066 B2
(45) Date of Patent: Aug. 16, 2005

(54) HIGHLY DEFECTIVE OXIDES AS SINTER RESISTANT THERMAL BARRIER COATING

(75) Inventor: Ramesh Subramanian, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 133 days.

(21) Appl. No.: 10/010,676

(22) Filed: Dec. 6, 2001

(65) Prior Publication Data

US 2003/0108768 A1 Jun. 12, 2003

(51) Int. Cl.$^7$ .............................................. C04B 35/48
(52) U.S. Cl. ...................... 501/103; 501/134; 501/152; 252/62
(58) Field of Search ................. 501/103, 134, 501/152; 252/62

(56) References Cited

U.S. PATENT DOCUMENTS

| | | | |
|---|---|---|---|
| 3,634,113 A | * | 1/1972 | Fahrenbacher |
| 3,957,500 A | * | 5/1976 | Pitts |
| 4,153,469 A | | 5/1979 | Alexandrov et al. |
| 4,321,310 A | | 3/1982 | Ulion |
| 4,321,311 A | | 3/1982 | Strangeman |
| 4,507,394 A | * | 3/1985 | Mase et al. .................. 501/103 |
| 4,535,033 A | | 8/1985 | Stecura |
| 4,599,270 A | * | 7/1986 | Rangaswamy et al. ..... 428/402 |
| 4,656,145 A | | 4/1987 | Soroi |
| 4,735,666 A | | 4/1988 | Mase et al. |
| 4,748,138 A | * | 5/1988 | Watanabe et al. ............. 501/88 |
| 4,931,214 A | * | 6/1990 | Worrell et al. ............... 252/520 |
| 5,151,201 A | | 9/1992 | Fishler et al. |
| 5,155,071 A | * | 10/1992 | Jacobson ..................... 501/103 |
| 5,177,040 A | | 1/1993 | Tamamaki et al. |
| 5,780,110 A | | 7/1998 | Field |
| 5,789,330 A | | 8/1998 | Kondo et al. |
| 6,025,078 A | | 2/2000 | Rickerby et al. |
| 6,042,898 A | | 3/2000 | Burns et al. |
| 6,117,560 A | | 9/2000 | Maloney |
| 6,123,997 A | | 9/2000 | Schaeffer et al. |
| 6,151,547 A | | 11/2000 | Kumar et al. |
| 6,177,200 B1 | * | 1/2001 | Maloney ..................... 428/472 |
| 6,187,453 B1 | | 2/2001 | Maloney |
| 6,190,124 B1 | | 2/2001 | Freling et al. |
| 6,203,927 B1 | | 3/2001 | Subramanian et al. |
| 6,231,998 B1 | | 5/2001 | Bowker et al. |
| 6,258,467 B1 | | 7/2001 | Subramanian |
| 6,294,260 B1 | | 9/2001 | Subramanian |
| 6,296,945 B1 | | 10/2001 | Subramanian |
| 6,482,537 B1 | * | 11/2002 | Strangman et al. ......... 428/633 |

FOREIGN PATENT DOCUMENTS

| | | | |
|---|---|---|---|
| DE | 4302167 | * | 2/1994 |
| EP | WO 9415000 | | 7/1994 |
| EP | 0366924 A | | 7/1998 |
| EP | 1026366 A | | 8/2000 |
| EP | 1055743 A | | 11/2000 |
| EP | 1318215 | * | 6/2003 |

OTHER PUBLICATIONS

Kazuo Shinozaki, Hongrong Sun, Keizo Uematsu, Nobuyasu Mizutani, and Masanori Kato. Sintering $Sm_2O_3$—$ZrO_2$ Solid Solution. *The Chemical Society of Japan*, 1981, (9), pp. 1454–1461.

\* cited by examiner

*Primary Examiner*—Paul Marcantoni

(57) ABSTRACT

A thermal barrier coating material formed of a highly defective cubic matrix structure having a concentration of a stabilizer sufficiently high that the oxygen vacancies created by the stabilizer interact within the matrix to form multi-vacancies, thereby improving the sintering resistance of the material. The concentration of stabilizer within the cubic matrix structure is greater than that concentration of stabilizer necessary to give the matrix a peak ionic conductivity value. The concentration of stabilizer may be at least 30 wt. %. Embodiments include a cubic matrix of zirconia stabilized by at least 30–50 wt. % yttria, and a cubic matrix of hafnia stabilized by at least 30–50 wt. % gadolinia.

10 Claims, 1 Drawing Sheet

HIGHLY DEFECTIVE OXIDES AS SINTER RESISTANT THERMAL BARRIER COATING

This invention was made with United States Government support under contract number DE-FC21-95MC32267 awarded by the Department of Energy. The Government has certain rights in this invention.

FIELD OF THE INVENTION

This invention relates generally to the field of thermal barrier coatings and particularly to ceramic thermal barrier coatings as may be used to protect metallic components in a very high temperature application such as a gas turbine engine.

BACKGROUND OF THE INVENTION

The demand for continued improvement in the efficiency of gas turbine engines has driven the designers of such machines to specify increasingly higher firing temperatures. Nickel and cobalt based superalloys are now commonly used to form components in the combustion gas flow path because of their resistance to the high temperature oxidizing environment. However, even modern superalloys are not capable of surviving long term operation at the firing temperatures of modern gas turbine engines that may exceed 1,400° C. In order to provide additional protection to the metal components in the hottest areas of a gas turbine engine, it is known to coat the metal substrate with a layer of ceramic material to thermally insulate and chemically isolate the substrate from the hot combustion gasses. A widely used material for this application is yttria stabilized zirconia (YSZ), with 8 wt. % $Y_2O_3$ (8YSZ) being a common composition.

The thermal insulating properties of ceramic thermal barrier coatings have been the subjects of many design improvements over the years. U.S. Pat. No. 6,025,078 describes the use of zirconium stabilized with both yttria and erbia. The erbia reduces the thermal conductivity of the material when compared to zirconium stabilized by yttria alone. This patent suggests that the material may include between 4–20 wt. % yttria, while it may include between 5–25 wt. % erbia. Specific embodiments are described as having as much as 29 wt. % combined yttria and erbia stabilizer.

It is also important for a ceramic thermal barrier coating to exhibit phase stability over the expected operating range of operating temperatures. A change in phase may be accompanied by a change in volume, leading to the development of stresses within the coating and between the coating and the substrate. A thermal barrier coating having high phase stability is described in U.S. Pat. No. 6,258,467 as having a pyrochlore crystal structure. The pyrochlore structure is described as having several advantages over a conventional fluorite (cubic) structure, including a higher resistance to sintering. The patent teaches that the oxygen defects in a conventional yttria stabilized zirconia (YSZ) structure are very mobile and can contribute to sintering, whereas in the pyrochlore structure the oxygen defects are ordered and, hence, can be more resistant to sintering. Another pyrochlore material, lanthanum zirconate, is described in U.S. Pat. No. 6,117,560.

Both pyrochlore and non-pyrochlore structures of gadolinia zirconia oxide are disclosed in U.S. Pat. No. 6,177,200 as having a reduced thermal conductivity when compared to conventional YSZ. However, this material has a mass about 10% greater than 7YSZ, which is a disadvantage for rotating components where centrifugal forces may be limiting.

U.S. Pat. No. 4,535,033 describes a thermal barrier coating of zirconia partially stabilized with ytterbia. That patent describes a preferred embodiment having 12.4 wt. % ytterbia and including the cubic, monoclinic and tetragonal phases. This patent illustrates that the number of thermal cycles to failure decreases for this material with an increasing stabilizer content, with data supporting this trend being plotted up to about 25 wt. % ytterbia.

U.S. Pat. No. 6,187,453 describes how a coating formed by an EB-PVD process may not have a composition corresponding to the target material used to form the coating. The patent discloses a process for forming a thermal barrier coating material being a homogeneous mixture of yttria and ceria having 5–60 wt. % yttria with the balance being ceria. This patent also teaches that an increased amount of yttria in ceria will enhance the erosion resistance of the material. In contrast, the patent notes that zirconia stabilized with 20 wt. % yttria demonstrates a dramatically increased rate of erosion when compared to YSZ having only 12 wt. % yttria.

U.S. Pat. No. 6,231,998 discloses hexagonal phase zirconium scandate with up to 42 wt. % $Sc_2O_3$. That patent suggests that this material will be more resistant to sintering than YSZ because oxygen vacancies in the crystal structure of YSZ promote diffusion of species through the structure, thereby resulting in relatively easy sintering.

There is an ongoing need for thermal barrier coating materials having improved performance properties in high temperature corrosive environment applications. For land-based power generation applications, resistance to sintering is a most important property. Unlike airborne applications where frequent power transients tend to mitigate the impact of sintering, land-based power generation machines must operate for long periods of time at constant power levels. To be commercially viable, any new thermal barrier coating material should be compatible with existing fabrication processes, should have a mass and a cost comparable to the commonly used 8YSZ material.

SUMMARY OF THE INVENTION

The applicant has discovered that a highly defective cubic ceramic matrix material is unexpectedly useful as a thermal barrier coating material. The applicant has found that a cubic YSZ material having at least 30 wt. % of $Y_2O_3$ will demonstrate a significantly improved resistance to sintering when compared to prior art materials such as 8YSZ.

The presence of molecules of a stabilizer material within the ceramic matrix structure will result in an increase in the formation of oxygen vacancies within the matrix. As taught in the prior art, this increase in oxygen vacancies will compromise the sintering resistance of the material, since the vacancies facilitate the diffusion of species throughout the matrix. However, the applicant has noted that when the composition exceeds a value above which the vacancies start to interact to form multi-vacancies, the diffusion coefficients will decrease and the sintering resistance will improve. Concentrations of stabilizer in a cubic matrix that exceed prior art concentrations can provide a thermal barrier coating material with resistance to sintering that far exceeds commonly used prior art materials.

Accordingly, a ceramic thermal barrier coating material is described herein as including a cubic matrix structure of $ZrO_2$ stabilized by a concentration of $Y_2O_3$ greater than that concentration of $Y_2O_3$ that would result in a peak ionic conductivity in the matrix. The thermal barrier coating material may include at least 30 or 40 or 50 wt. % $Y_2O_3$.

A thermal barrier coating material is further described herein as including a cubic matrix structure of $ZrO_2$ stabilized by a concentration of $Y_2O_3$, wherein the concentration of $Y_2O_3$ is sufficiently high to create a quantity of multi-vacancy defect clusters in the cubic matrix structure such that the material exhibits a resistance to sintering measured as linear shrinkage to be less than 4000 ppm after exposure to 1400° C. for 24 hours. A thermal barrier coating material is further described herein as including a cubic matrix structure of a rare earth oxide selected from the group of zirconia, hafnia and titania and containing a stabilizer selected from the group of lanthia, ytterbia and yttria, the material comprising a concentration of the stabilizer greater than that concentration of the stabilizer that would result in a peak ionic conductivity in the matrix. Such concentration may be at least 30 or 40 or 50 wt. % stabilizer.

A thermal barrier coating material is further described herein as including a cubic matrix structure of $HfO_2$ stabilized by a concentration of a rare earth oxide that is greater than that concentration of the rare earth oxide that would result in a peak ionic conductivity in the matrix. The rare earth oxide may be $Gd_2O_3$ in a concentration of at least 30 or 40 or 50 wt. % $Gd_2O_3$.

BRIEF DESCRIPTION OF THE DRAWINGS

These and other advantages of the invention will be more apparent from the following description in view of the drawings that show.

DETAILED DESCRIPTION OF THE INVENTION

Figure 1:
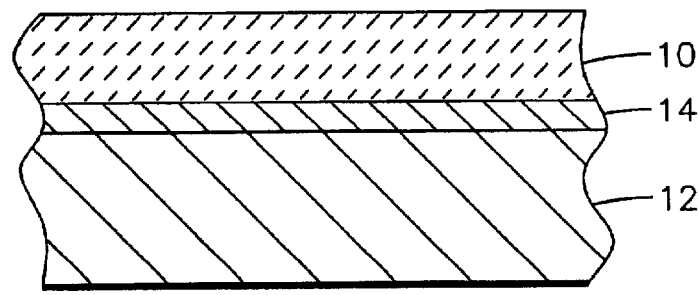
FIG. 1 is a partial cross-sectional view of a gas turbine component having a metallic substrate insulated by a thermal barrier coating.

An improved thermal barrier coating material 10 is illustrated in FIG. 1 as being disposed on a substrate material 12 such as may form a part of a gas turbine engine or other component exposed to a very high temperature environment. Such turbine hot section parts include rotating blades, stationary vanes, ring segments, combustor transitions, etc. The substrate may be one of the high temperature resistant nickel or cobalt based superalloy materials known in the art. A layer of bond coat material 14 may be disposed between the thermal barrier coating material 10 and the substrate material 12. Known bond coat materials include nickel aluminide, cobalt aluminide, platinum aluminide, and the commonly used MCrAlY alloys. An oxide layer (not shown) may be grown on the bond coat material 14 prior to the deposition of the thermal barrier coating material 10. The bond coat material 14 and the thermal barrier coating material 10 may be deposited by any method known in the art, such as APS, EB-PVD, sputtering, etc.

In one embodiment, the thermal barrier coating material 10 is a ytttria stabilized zirconia containing at least 30 wt. % $Y_2O_3$ and having a cubic matrix structure. Other embodiments include a ytttria stabilized zirconia containing at least 40 wt. % $Y_2O_3$, and a ytttria stabilized zirconia containing at least 50 wt. % $Y_2O_3$, both having a cubic matrix structure. Concentrations of yttria stabilizer of up to 50 mole % are believed to be useful in such cubic matrix materials for thermal barrier coating applications.

Figure 2:
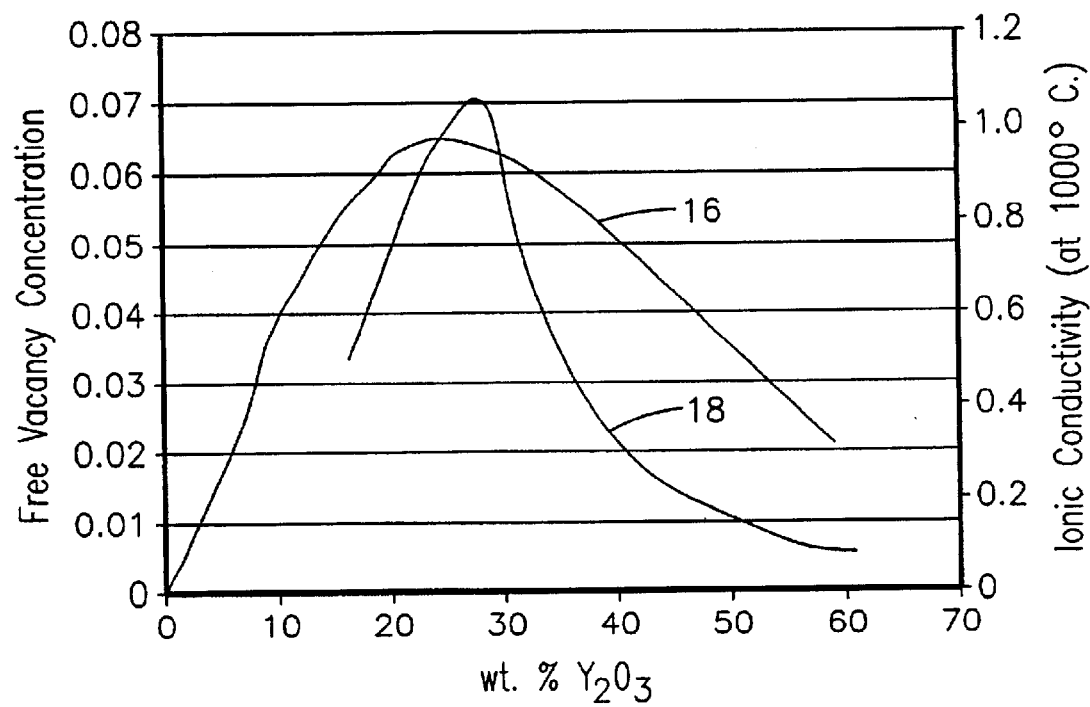
FIG. 2 is a graph illustrating the free vacancy concentration and the ionic conductivity of yttria stabilized zirconia as a function of the concentration of yttria.

FIG. 2 illustrates material properties related to the performance of these materials as ceramic thermal barrier coating materials. Curve 16 is the free vacancy concentration in a YSZ material as a function of the wt. % of yttria, and curve 18 is the ionic conductivity of the material as a function of the wt. % of yttria. Note that the above-described embodiments each include a concentration of yttria stabilizer that is greater than that concentration of $Y_2O_3$ that would result in a peak ionic conductivity in the matrix, and that is greater than that concentration of $Y_2O_3$ that would result in a peak free vacancy concentration in the matrix. The applicant has discovered that a cubic YSZ thermal barrier coating material having such an unusually high concentration of stabilizer will demonstrate a resistance to sintering that is significantly better than the prior art 8YSZ material. The resistance to sintering measured as linear shrinkage for 50 wt. % yttria stabilized zirconium has been measured using a high temperature dilatometer to be less than 4000 ppm after exposure to 1400° C. for 24 hours. The percentage shrinkage of an air plasma sprayed 8YSZ coating after 24 hours at 1,400° C. is a factor of 4 higher than that of the 50 wt. % YSZ.

The presence of molecules of a stabilizer material within a ceramic matrix structure will result in an increase in the formation of oxygen vacancies within the matrix. It is taught in the prior art that this increase in oxygen vacancies will compromise the sintering resistance of the material, since the vacancies facilitate the diffusion of species throughout the matrix. However, the applicant has noted that this adverse trend will reverse when the composition exceeds a value above which the vacancies start to interact to form multi-vacancies. The multi-vacancies are larger than the individual vacancies and are much less mobile in the matrix material. Thus, the diffusion coefficients will decrease and the sintering resistance of the material will improve. The multi-vacancies may be di-vacancies, i.e. the combination of two vacancies, or other forms of multi-vacancies.

Thermal barrier coating material 10 may further be a cubic matrix structure of zirconia stabilized by a concentration of ytterbia of at least 30 wt. % $Yb_2O_3$, or at least 40 wt. % $Yb_2O_3$, or at least 50 wt. % $Yb_2O_3$. Here, again, these concentrations of stabilizer are greater than the concentration of $Yb_2O_3$ that would result in a peak ionic conductivity in the matrix, and are greater than the concentration of $Yb_2O_3$ that would result in a peak free vacancy concentration in the matrix. Coincidentally, the thermal cyclic life data published in U.S. Pat. No. 4,535,033 are limited to only those concentrations of ytterbia that approach but do not exceed the peak free vacancy and peak ionic conductivity values. Thus, a linear extrapolation of the data of the '033 patent would lead to the erroneous conclusion that higher concentrations of stabilizer would be even less desirable. To the contrary, the applicant has found that a useful thermal barrier coating may be formed as a highly defective cubic matrix structure of ceramic oxide material wherein the concentration of stabilizer is sufficiently high to create a quantity of multi-vacancy defect clusters in the cubic matrix structure. Such a material can exhibit an increased resistance to sintering when compared to the same matrix material stabilized by a more traditional concentration of such stabilizer, for example 7–12 wt. %.

The applicant believes that other combinations of ceramic oxides having a cubic matrix structure and stabilized by a rare earth oxide may be useful when having a concentration of the stabilizer that is greater than that necessary to result in a peak ionic conductivity of the matrix. For example, the cubic matrix structure may be a rare earth oxide selected from the group of zirconia, hafnia and titania and the stabilizer may be selected from the group of lanthia, ytterbia and yttria. Another desirable thermal barrier coating material 10 is believed to be a cubic matrix structure of hafnia stabilized by a concentration of a rare earth oxide such as gadolinia greater than that concentration of $Gd_2O_3$ that would result in a peak ionic conductivity in the matrix. Each of these above-described materials may contain at least 30% or 40% or 50% by weight of the stabilizer oxide.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A thermal barrier coating composition consisting essentially of a cubic matrix structure of $ZrO_2$ stabilized by a concentration of $Y_2O_3$ that is at least 30 wt. % and that is greater than that concentration of $Y_2O_3$ that would result in a peak ionic conductivity in the matrix.

2. The thermal barrier coating composition of claim 1, further comprising at least 40 wt. % $Y_2O_3$.

3. The thermal barrier coating composition of claim 1, further comprising at least 50 wt. % $Y_2O_3$.

4. A thermal barrier coating composition consisting of a cubic matrix structure of $ZrO_2$ stabilized by a concentration of $Y_2O_3$ that is at least 30 wt. %, wherein the concentration of $Y_2O_3$ is sufficiently high to create a quantity of multi-vacancy defect clusters in the cubic matrix structure such that the material exhibits a resistance to sintering measured as linear shrinkage to be less than 4000 ppm after exposure to 1400° C. for 24 hours.

5. A thermal barrier coating composition consisting essentially of a cubic matrix structure of a rare earth oxide selected from the group of zirconia, hafnia and titania and containing a stabilizer selected from the group of lanthia, ytterbia and yttria, the material comprising a concentration of the stabilizer that is at least 30 wt. % and that is greater than that concentration of the stabilizer that would result in a peak ionic conductivity in the matrix.

6. The thermal barrier coating composition of claim 5, further comprising at least 40 wt. % stabilizer.

7. The thermal barrier coating composition of claim 5, further comprising at least 50 wt. % stabilizer.

8. A thermal barrier coating composition consisting essentially of a cubic matrix structure of $HfO_2$ stabilized by a concentration of a rare earth oxide $Gd_2O_3$ that is at least 30 wt. % and that is greater than that concentration of the rare earth oxide that would result in a peak ionic conductivity in the matrix.

9. The thermal barrier coating composition of claim 8, further comprising at least 40 wt. % $Gd_2O_3$.

10. The thermal barrier coating composition of claim 8, further comprising at least 50 wt. % $Gd_2O_3$.

* * * * *